US009395509B2

(12) United States Patent
Petersen et al.

(10) Patent No.: US 9,395,509 B2
(45) Date of Patent: Jul. 19, 2016

(54) FIBER CABLE FAN-OUT ASSEMBLY AND METHOD

(71) Applicants: ADC Telecommunications, Inc., Berwyn, PA (US); Tyco Electronics Corporation, Berwyn, PA (US)

(72) Inventors: Cyle D. Petersen, Belle Plaine, MN (US); Jeffrey Dean Shipe, Camp Hill, PA (US); Jonathan R. Kaml, Shakopee, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/747,282

(22) Filed: Jun. 23, 2015

(65) Prior Publication Data

US 2015/0370029 A1    Dec. 24, 2015

Related U.S. Application Data

(60) Provisional application No. 62/015,956, filed on Jun. 23, 2014.

(51) Int. Cl.
*G02B 6/44* (2006.01)
(52) U.S. Cl.
CPC .............. *G02B 6/4471* (2013.01); *G02B 6/443* (2013.01); *G02B 6/4432* (2013.01); *G02B 6/4476* (2013.01); *Y10T 29/49828* (2015.01); *Y10T 29/49909* (2015.01)
(58) Field of Classification Search
CPC .. G02B 6/4472; G02B 6/4404; G02B 6/4432; G02B 6/4476; G02B 6/448
USPC .................................. 385/114–115, 119, 147
See application file for complete search history.

(56) References Cited

U.S. PATENT DOCUMENTS

| 4,435,612 A | 3/1984 | Smith |
| 4,650,933 A | 3/1987 | Benda et al. |

(Continued)

FOREIGN PATENT DOCUMENTS

| DE | 41 30 706 A1 | 3/1993 |
| DE | 202 01 170 U1 | 5/2002 |

(Continued)

OTHER PUBLICATIONS

International Search Report and Written Opinion dated Oct. 19, 2015 for PCT/US2015/037176.

*Primary Examiner* — Akm Enayet Ullah
(74) *Attorney, Agent, or Firm* — Merchant & Gould P.C.

(57) ABSTRACT

One aspect of the present disclosure relates to a multi-fiber cable assembly including a multi-fiber cable. The multi-fiber cable includes a block of optical fiber ribbons, the block having an external profile; a strength layer surrounding the optical fiber ribbons; a jacket surrounding the strength layer; and a fan-out arrangement disposed at a first end of the multi-fiber cable. The fan-out arrangement includes an outer shell extending from a first end to a second end, the outer shell including a first interior mounting location spaced axially from a second interior mounting location; an orientation plug defining a longitudinal through-passage through which the block of optical fiber ribbons extends, the through-passage having an internal profile that inhibits rotation of the block of optical fiber ribbons, the orientation plug including a keying arrangement that axially and rotationally fixes the orientation plug to the outer shell at the first interior mounting location; and a furcation tube assembly axially and rotationally fixed to the outer shell at the second interior mounting location, the furcation tube assembly includes a plurality of furcation tube arrangements mounted to an organizer.

26 Claims, 15 Drawing Sheets

(56) References Cited

U.S. PATENT DOCUMENTS

| | | |
|---|---|---|
| 4,768,961 A | 9/1988 | Lau |
| 4,770,639 A | 9/1988 | Lau |
| 4,797,114 A | 1/1989 | Lau |
| 4,820,200 A | 4/1989 | Lau |
| 4,840,568 A | 6/1989 | Burroughs et al. |
| 5,146,532 A | 9/1992 | Hodge |
| 5,189,410 A | 2/1993 | Kosugi et al. |
| 5,199,878 A | 4/1993 | Dewey et al. |
| 5,214,673 A | 5/1993 | Morgenstern et al. |
| 5,317,663 A | 5/1994 | Beard et al. |
| 5,339,379 A | 8/1994 | Kutsch et al. |
| 5,363,465 A | 11/1994 | Korkowski et al. |
| 5,393,249 A | 2/1995 | Morgenstern et al. |
| 5,432,875 A | 7/1995 | Korkowski et al. |
| 5,467,062 A | 11/1995 | Burroughs |
| 5,497,444 A | 3/1996 | Wheeler |
| 5,582,525 A | 12/1996 | Louwagie et al. |
| 5,613,030 A | 3/1997 | Hoffer et al. |
| 5,627,925 A | 5/1997 | Alferness et al. |
| 5,685,741 A | 11/1997 | Dewey et al. |
| 5,694,511 A | 12/1997 | Pimpinella et al. |
| 5,701,380 A | 12/1997 | Larson et al. |
| 5,717,810 A | 2/1998 | Wheeler |
| 5,946,440 A | 8/1999 | Puetz |
| 6,116,961 A | 9/2000 | Henneberger et al. |
| 6,208,796 B1 | 3/2001 | Vigliaturo |
| 6,226,111 B1 | 5/2001 | Chang et al. |
| 6,259,851 B1 | 7/2001 | Daoud |
| 6,263,136 B1 | 7/2001 | Jennings et al. |
| 6,307,998 B2 | 10/2001 | Vigliaturo |
| 6,328,608 B1 | 12/2001 | Olson et al. |
| 6,363,183 B1 | 3/2002 | Koh |
| 6,363,198 B1 | 3/2002 | Braga et al. |
| 6,370,294 B1 | 4/2002 | Pfeiffer et al. |
| 6,418,262 B1 | 7/2002 | Puetz et al. |
| 6,424,781 B1 | 7/2002 | Puetz et al. |
| 6,511,330 B1 | 1/2003 | Norris |
| 6,532,332 B2 | 3/2003 | Solheid et al. |
| 6,535,682 B1 | 3/2003 | Puetz et al. |
| 6,554,652 B1 | 4/2003 | Musolf et al. |
| 6,556,738 B2 | 4/2003 | Pfeiffer et al. |
| 6,556,763 B1 | 4/2003 | Puetz et al. |
| 6,579,014 B2 | 6/2003 | Melton et al. |
| 6,591,051 B2 | 7/2003 | Solheid et al. |
| 6,599,024 B2 | 7/2003 | Zimmel |
| 6,614,953 B2 | 9/2003 | Strasser et al. |
| 6,614,979 B2 | 9/2003 | Bourdeau |
| 6,616,459 B2 | 9/2003 | Norris |
| 6,632,106 B2 | 10/2003 | Musolf et al. |
| RE38,311 E | 11/2003 | Wheeler |
| 6,647,197 B1 | 11/2003 | Marrs et al. |
| 6,668,108 B1 | 12/2003 | Helkey et al. |
| 6,688,780 B2 | 2/2004 | Duran |
| 6,719,382 B2 | 4/2004 | Sucharczuk et al. |
| 6,738,555 B1 | 5/2004 | Cooke et al. |
| 6,760,531 B1 | 7/2004 | Solheid et al. |
| 6,761,594 B2 | 7/2004 | Johnsen et al. |
| 6,810,193 B1 | 10/2004 | Müller |
| 6,822,874 B1 | 11/2004 | Marler |
| 6,824,312 B2 | 11/2004 | McClellan et al. |
| 6,830,465 B2 | 12/2004 | Norris et al. |
| 6,832,035 B1 | 12/2004 | Daoud et al. |
| 6,848,952 B2 | 2/2005 | Norris |
| 6,850,685 B2 | 2/2005 | Tinucci et al. |
| 6,863,446 B2 | 3/2005 | Ngo |
| 6,885,798 B2 | 4/2005 | Zimmel |
| 6,890,187 B2 | 5/2005 | Norris |
| 6,937,807 B2 | 8/2005 | Franklin et al. |
| 6,983,095 B2 | 1/2006 | Reagan et al. |
| 7,029,322 B2 | 4/2006 | Ernst et al. |
| 7,035,510 B2 | 4/2006 | Zimmel et al. |
| 7,118,284 B2 | 10/2006 | Nakajima et al. |
| 7,142,764 B2 | 11/2006 | Allen et al. |
| 7,190,874 B1 | 3/2007 | Barth et al. |
| 7,194,181 B2 | 3/2007 | Holmberg et al. |
| 7,218,827 B2 | 5/2007 | Vongseng et al. |
| 7,233,731 B2 | 6/2007 | Solheid et al. |
| 7,303,220 B2 | 12/2007 | Zellak |
| 7,310,474 B2 | 12/2007 | Kanasaki et al. |
| 7,333,606 B1 | 2/2008 | Swam et al. |
| 7,346,254 B2 | 3/2008 | Kramer et al. |
| 7,349,616 B1 | 3/2008 | Castonguay et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,418,181 B2 | 8/2008 | Zimmel et al. |
| 7,418,186 B1 | 8/2008 | Grubish et al. |
| 7,453,706 B2 | 11/2008 | Clark et al. |
| 7,470,068 B2 | 12/2008 | Kahle et al. |
| 7,495,931 B2 | 2/2009 | Clark et al. |
| 7,499,622 B2 | 3/2009 | Castonguay et al. |
| 7,606,459 B2 | 10/2009 | Zimmel et al. |
| 7,636,507 B2 | 12/2009 | Lu et al. |
| 7,748,911 B2 | 7/2010 | Keenum et al. |
| 7,853,112 B2 | 12/2010 | Zimmel et al. |
| 7,885,505 B2 | 2/2011 | Zimmel |
| 7,912,336 B2 | 3/2011 | Zimmel |
| 8,081,857 B2 | 12/2011 | Nair et al. |
| 8,346,045 B2 | 1/2013 | Zimmel et al. |
| 8,380,036 B2 | 2/2013 | Smith et al. |
| 8,798,428 B2 | 8/2014 | Zimmel et al. |
| 8,824,850 B2 | 9/2014 | Garcia et al. |
| 2002/0131750 A1 | 9/2002 | Holman et al. |
| 2002/0181896 A1 | 12/2002 | McClellan et al. |
| 2003/0031423 A1 | 2/2003 | Zimmel |
| 2003/0132685 A1 | 7/2003 | Sucharczuk et al. |
| 2003/0134541 A1 | 7/2003 | Johnsen et al. |
| 2003/0147597 A1 | 8/2003 | Duran |
| 2003/0169974 A1 | 9/2003 | Ngo |
| 2003/0185535 A1 | 10/2003 | Tinucci et al. |
| 2003/0202765 A1 | 10/2003 | Franklin et al. |
| 2004/0240826 A1 | 12/2004 | Daoud et al. |
| 2005/0002633 A1 | 1/2005 | Solheid et al. |
| 2005/0053341 A1 | 3/2005 | Zimmel |
| 2005/0058402 A1 | 3/2005 | Ernst et al. |
| 2005/0067847 A1 | 3/2005 | Zellak |
| 2005/0105873 A1 | 5/2005 | Reagan et al. |
| 2005/0105879 A1 | 5/2005 | Kanasaki et al. |
| 2005/0167147 A1 | 8/2005 | Marsac et al. |
| 2005/0232550 A1 | 10/2005 | Nakajima et al. |
| 2005/0232551 A1 | 10/2005 | Chang et al. |
| 2005/0232565 A1 | 10/2005 | Heggestad et al. |
| 2005/0281526 A1 | 12/2005 | Vongseng et al. |
| 2006/0083468 A1 | 4/2006 | Kahle et al. |
| 2006/0093301 A1 | 5/2006 | Zimmel et al. |
| 2006/0153516 A1 | 7/2006 | Napiorkowski et al. |
| 2006/0188210 A1 | 8/2006 | Zimmel |
| 2006/0233508 A1 | 10/2006 | Mann et al. |
| 2006/0269198 A1 | 11/2006 | Blazer et al. |
| 2006/0269205 A1 | 11/2006 | Zimmel |
| 2006/0269206 A1 | 11/2006 | Zimmel |
| 2006/0285807 A1 | 12/2006 | Lu et al. |
| 2007/0036503 A1 | 2/2007 | Solheid et al. |
| 2007/0047893 A1 | 3/2007 | Kramer et al. |
| 2007/0147765 A1 | 6/2007 | Gniadek et al. |
| 2007/0172172 A1 | 7/2007 | Theuerkorn et al. |
| 2007/0189692 A1 | 8/2007 | Zimmel et al. |
| 2008/0124039 A1 | 5/2008 | Gniadek et al. |
| 2008/0138026 A1 | 6/2008 | Yow et al. |
| 2008/0253730 A1 | 10/2008 | Cox et al. |
| 2008/0317415 A1 | 12/2008 | Hendrickson et al. |
| 2009/0022468 A1 | 1/2009 | Zimmel |
| 2009/0022469 A1 | 1/2009 | Zimmel |
| 2009/0060421 A1 | 3/2009 | Parikh et al. |
| 2009/0116806 A1 | 5/2009 | Zimmel et al. |
| 2010/0092136 A1 | 4/2010 | Nhep |
| 2010/0158464 A1 | 6/2010 | Zimmel et al. |
| 2011/0164853 A1 | 7/2011 | Corbille et al. |
| 2011/0182558 A1 | 7/2011 | Garcia et al. |

(56) References Cited

U.S. PATENT DOCUMENTS

| | | |
|---|---|---|
| 2013/0077928 A1 | 3/2013 | Hsing |
| 2013/0114937 A1 | 5/2013 | Zimmel et al. |
| 2015/0110442 A1 | 4/2015 | Zimmel et al. |

FOREIGN PATENT DOCUMENTS

| | | |
|---|---|---|
| DE | 20 2006 006 016 U1 | 8/2006 |
| EP | 0 202 994 A1 | 11/1986 |
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| EP | 1 589 361 A1 | 10/2005 |
| GB | 2 300 978 A | 11/1996 |
| JP | 1-317824 | 12/1989 |
| WO | WO 96/36896 | 11/1996 |
| WO | WO 00/75706 A2 | 12/2000 |
| WO | WO 02/39170 A2 | 5/2002 |
| WO | WO 02/099528 A1 | 12/2002 |
| WO | WO 02/103429 A2 | 12/2002 |
| WO | WO 03/093889 A1 | 11/2003 |
| WO | WO 2006/127397 A1 | 11/2006 |
| WO | WO 2015/200321 A1 | 12/2015 |

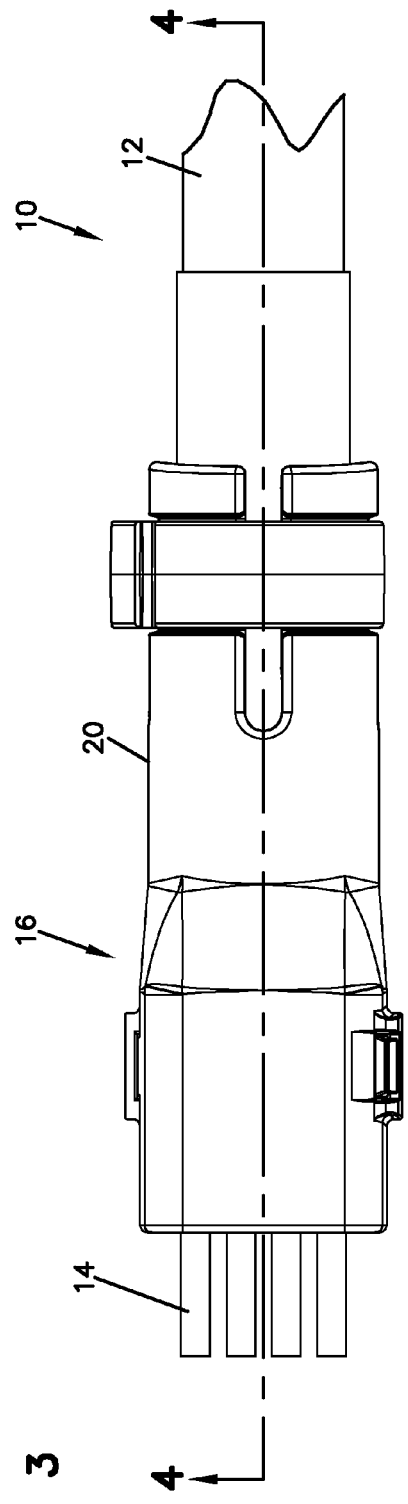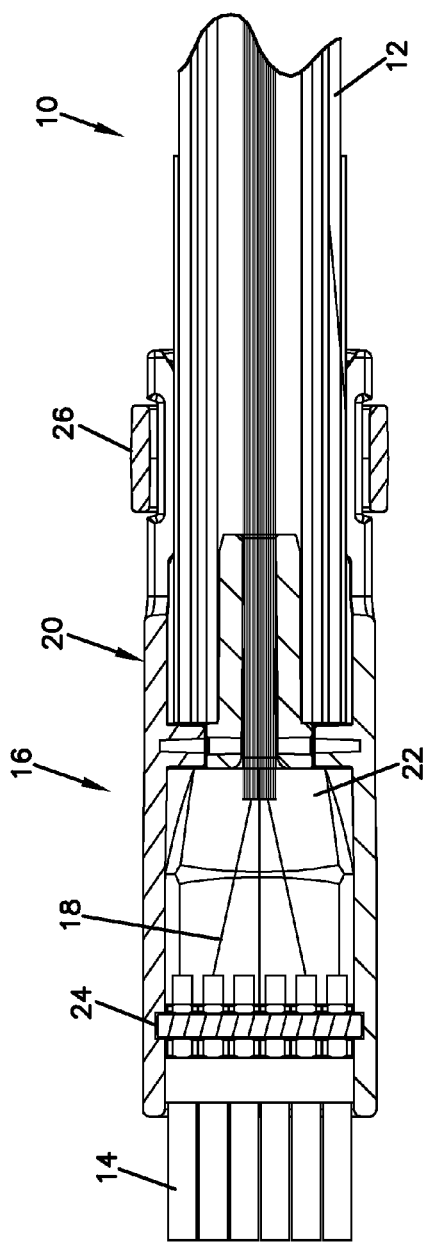
FIG. 3
FIG. 4

FIBER CABLE FAN-OUT ASSEMBLY AND METHOD

CROSS REFERENCE TO RELATED APPLICATION

This application claims the benefit of U.S. Provisional Patent Application Ser. No. 62/015,956, filed Jun. 23, 2014, titled FIBER CABLE FAN-OUT ASSEMBLY AND METHOD, which application is hereby incorporated by reference in its entirety.

TECHNICAL FIELD

The present invention relates to a telecommunications fanout assembly and method for fanning out a multi-fiber cable into individual fibers.

BACKGROUND OF THE INVENTION

Cable fanouts are known which define a location where a single telecommunications cable including a plurality of signal-carrying members is fanned out or broken out into individual cables. There is a need for improved developments in this area.

SUMMARY OF THE INVENTION

One aspect of the present disclosure relates to a multi-fiber cable assembly including a multi-fiber cable. The multi-fiber cable includes a block of optical fiber ribbons, the block having an external profile; a strength layer surrounding the optical fiber ribbons; a jacket surrounding the strength layer; and a fan-out arrangement disposed at a first end of the multi-fiber cable. The fan-out arrangement includes an outer shell extending from a first end to a second end, the outer shell including a first interior mounting location spaced axially from a second interior mounting location; an orientation plug defining a longitudinal through-passage through which the block of optical fiber ribbons extends, the through-passage having an internal profile that inhibits rotation of the block of optical fiber ribbons, the orientation plug including a keying arrangement that axially and rotationally fixes the orientation plug to the outer shell at the first interior mounting location; and a furcation tube assembly axially and rotationally fixed to the outer shell at the second interior mounting location, the furcation tube assembly includes a plurality of furcation tube arrangements mounted to an organizer.

Another aspect of the present disclosure relates to a fan-out arrangement including an outer shell extending from a first end to a second end, the outer shell including a first part that cooperates with a second part to define a through-passage between the first and second ends, the outer shell including an interior mounting location disposed within the through-passage; a cable anchor arrangement disposed at the first end of the outer shell; and a furcation tube assembly disposed and axially fixed at the interior mounting location. The furcation tube assembly includes a plurality of furcation tube arrangements mounted to an organizer and the organizer defines a plurality of slots having open ends such that each slot defines a plurality of indexed positions. Each furcation tube arrangement includes a furcation tube, an insert, and a crimp sleeve. The furcation tube can be mounted to a first end of the insert using the crimp sleeve, where a second end of each insert is disposed within one of the slots of the organizer at one of the indexed positions. The furcation tube arrangements extend from the organizer in a series of rows.

A further aspect of the present disclosure relates to a method of fanning out an optical fiber ribbon of a cable, the optical fiber ribbon includes a plurality of optical fibers. The method includes threading furcation tube arrangements over the optical fibers of the optical fiber ribbon, each furcation tube arrangement being threaded over at least one of the optical fibers; sliding each of the furcation tube arrangements through an open end of one of a plurality of slots defined in an organizer; positioning each furcation tube arrangement at an indexed position along the slot; positioning the organizer within an outer shell so that the organizer is rotationally and axially fixed within the outer shell; and attaching the cable to the outer shell.

BRIEF DESCRIPTION OF THE DRAWINGS

FIG. 3 is side view of the fiber cable fan-out assembly of FIG. 1.

FIG. 4 is a cross-sectional view of the fiber cable fan-out assembly along lines 4-4 of FIG. 3.

DETAILED DESCRIPTION OF THE PREFERRED EMBODIMENT

Figure 1:
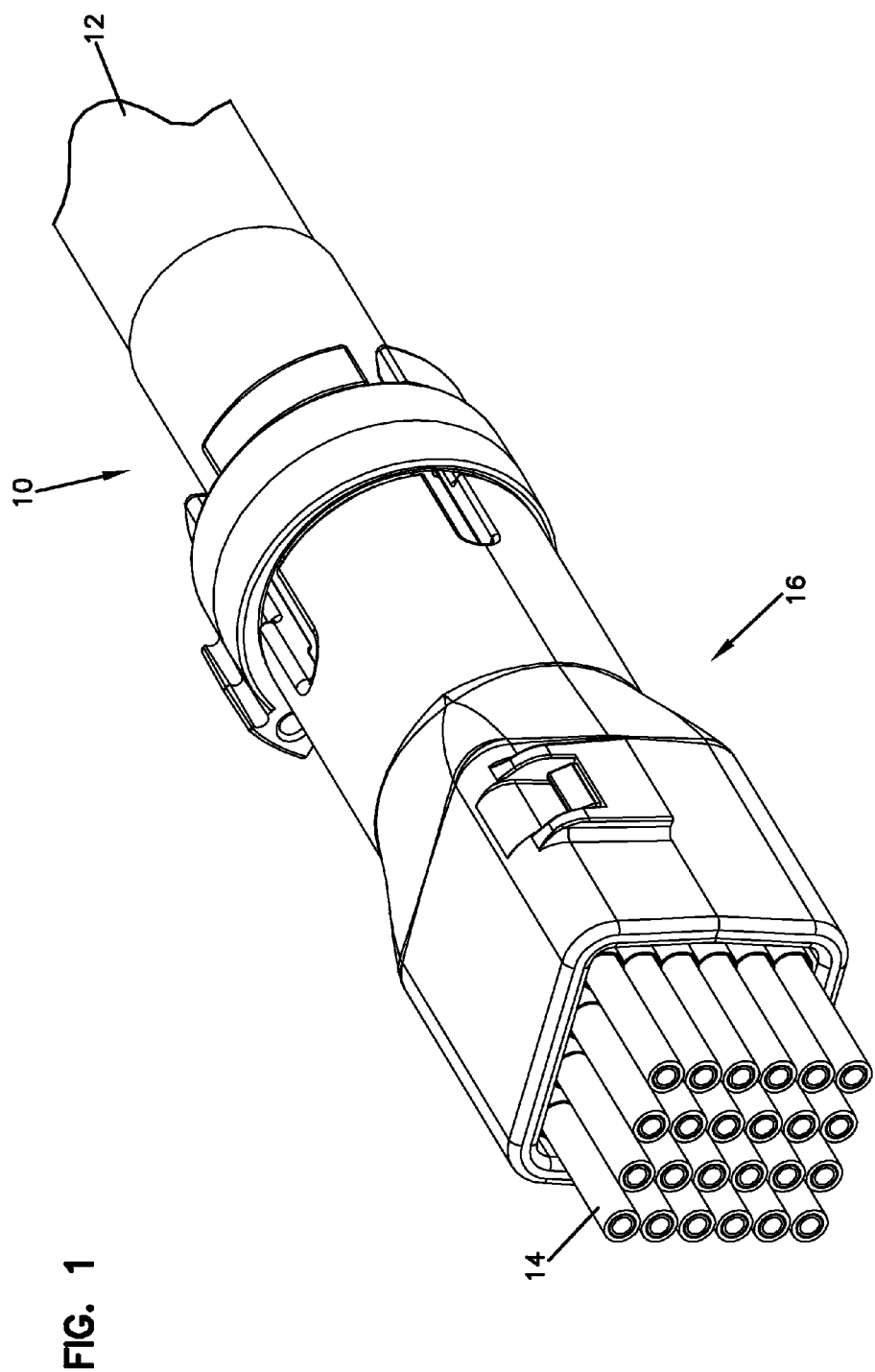
FIG. 1 is a perspective view of a fiber cable fan-out assembly in accordance with the principles of the present disclosure.
Figure 2:
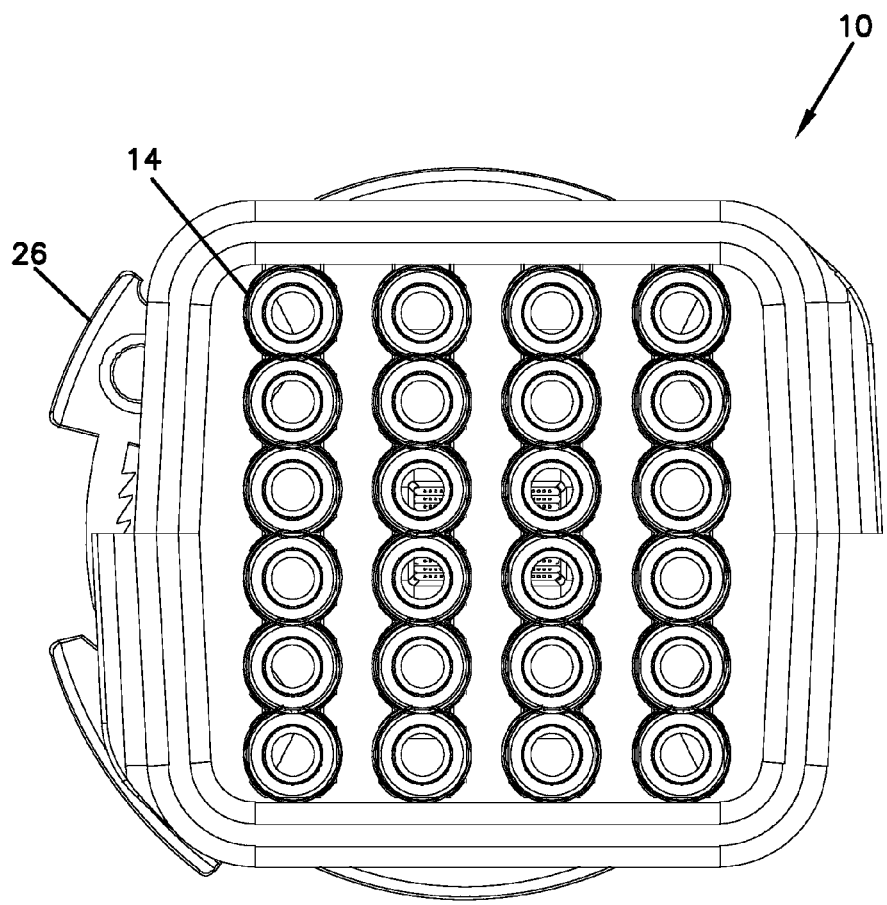
FIG. 2 is an end view of the fiber cable fan-out assembly of FIG. 1.

Referring to FIGS. 1-5, a fiber cable fan-out assembly 10 is shown. A multi-fiber cable 12 is fanned out into separate furcation tubes 14 at fan-out 16. The multi-fiber cable 12 can be any length as desired. In some examples, the multi-fiber cable 12 can be several hundred feet long. The multi-fiber cable 12 can be a 288 fiber cable that has 24 fiber ribbons. The 24 fiber ribbons can each fan-out to 12 fibers or 24 fiber MPO connectors. The fiber cable fan-out assembly 10 can be used in a variety of embodiments and environments where telecommunications equipment is employed. The fan-out 16 allows for the multi-fiber cable 12 to be broken out or fanned out into individual furcation tubes 14 which are typically terminated at distal ends with a connector, such as a SC connector.

Disposed within multi-fiber cable 12 is a plurality of individual fibers 18, visible in FIG. 4. At fan-out 16, the individual fibers 18 are broken out into the individual furcation tubes 14. The furcation tubes 14 may also be referred to as output cables. Often, the individual fibers 18 are bare fibers, such as 250 micron fibers, which are fragile and easily damaged. The furcation tubes 14 with their protective jackets offer protection of the individual fibers 18, twelve fibers per furcation tube 14, as the fibers 18 extend from the fan-out 16 to fiber terminations in the equipment. For example, the fiber cable fan-out assembly 10 can be used with a wall box where the multi-fiber cable 12 extends from the wall box to a remote multi-fiber connection, and fan-out 16 and the furcation tube 14 and connectors are housed within the wall box connected to fiber optic adapters in the wall box.

Figure 5:
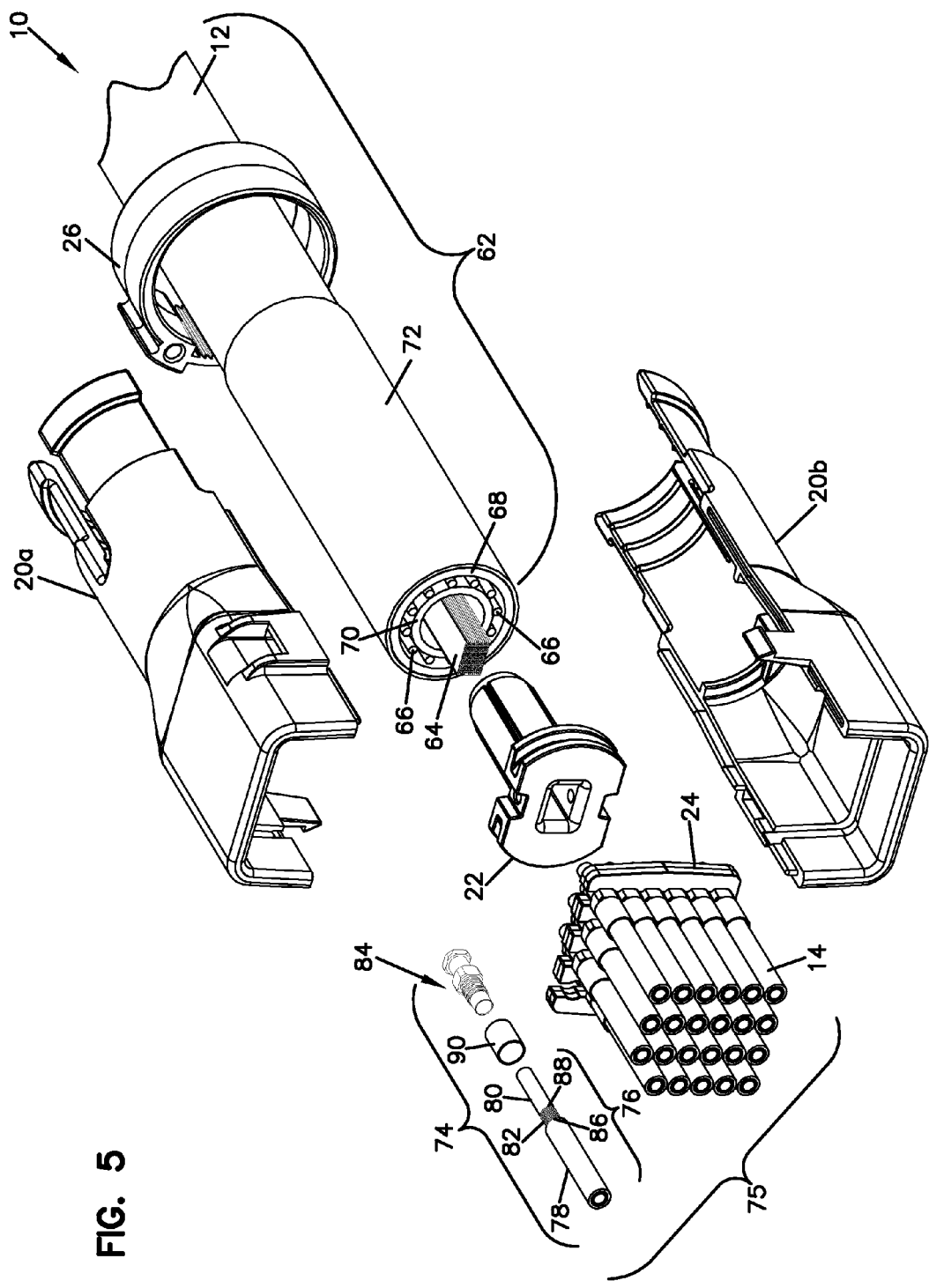
FIG. 5 is an exploded perspective view of the fiber cable fan-out assembly of FIG. 1.
Figure 6:
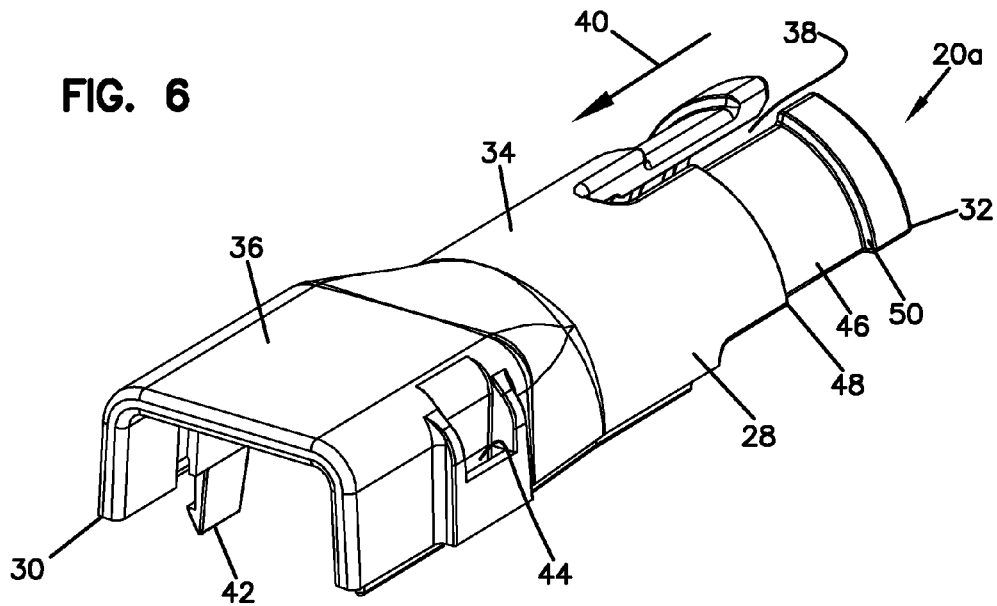
FIGS. 6 and 7 are perspective views of one of the housing portions of the fiber cable fan-out assembly of FIG. 1, the opposite housing portion having an identical construction.
Figure 7:
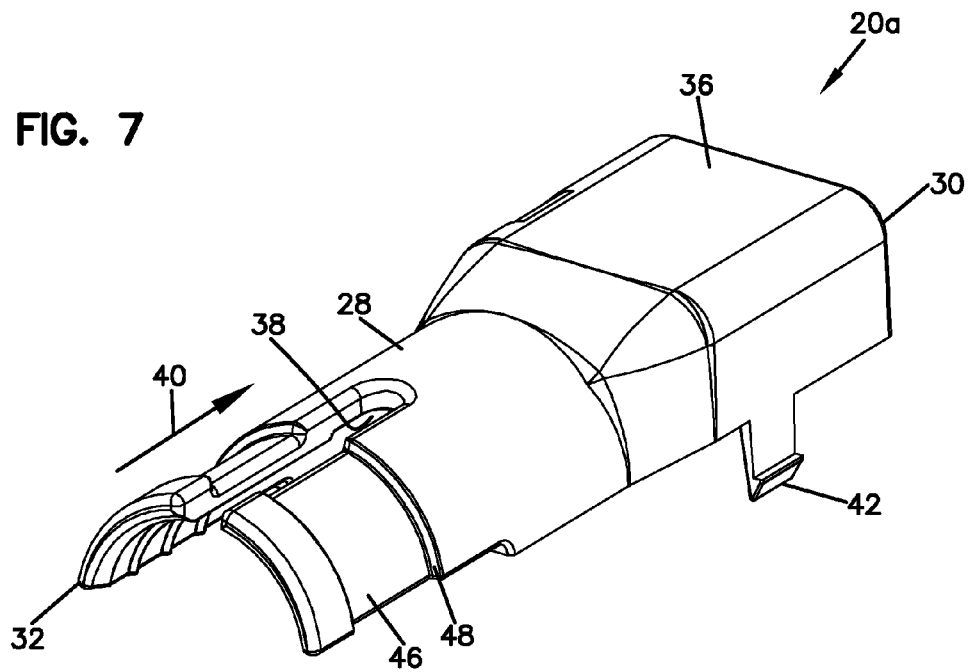

FIGS. 4 and 5 illustrate the fiber cable fan-out assembly 10 in accordance with the principles of the present disclosure. In this example, the fiber cable fan-out assembly 10 includes a housing 20 having an upper portion 20a and a lower portion 20b, a fiber ribbon plug 22, a furcation tube organizer 24, and a cable clamp 26. The furcation tubes 14 are shown mounted to the furcation tube organizer 24. As shown in FIGS. 1-4, the upper portion 20a mounts to the lower portion 20b of the housing 20 to enclose the fiber ribbon plug 22 and the furcation tube organizer 24. The fiber ribbon plug 22 is illustrated and described in more detail with reference to FIGS. 14-18. The furcation tube organizer 24 is illustrated and described in more detail with reference to FIGS. 19-21.

With reference to FIGS. 6-13, additional details of the upper portion 20a of the housing 20 is shown. The upper portion 20a is identically configured to the lower portion 20b, thus only the upper portion 20a will be described in detail. It will be appreciated that the lower portion 20b will likewise include all the features described with reference to the upper portion 20a.

In one example, the upper portion 20a includes a body 28 having a first end 30 and an opposite end 32 extending in a longitudinal direction. A first exterior surface 34 of the upper portion 20a defines a half-cylindrical shape and a second exterior surface 36 defines a half-square shape. The first exterior surface 34 includes a slot 38 that extends in a direction 40 from the opposite end 32 of the upper portion 20a. The upper portion 20a of the housing 20 can include a mating snap 42 that is adapted to correspond with a notch 44 of the lower portion 20b of the housing 20 for snapping the upper portion 20a to the lower portion 20b. The upper portion 20a further defines a recess 46 in the first exterior surface 34 of the upper portion 20a. In one example, the recess 46 can be adapted to receive the cable clamp 26 for holding the multi-fiber cable 12 in position. Side walls 48, 50 can help to hold the cable clamp 26 within the recess 46.

Figure 8:
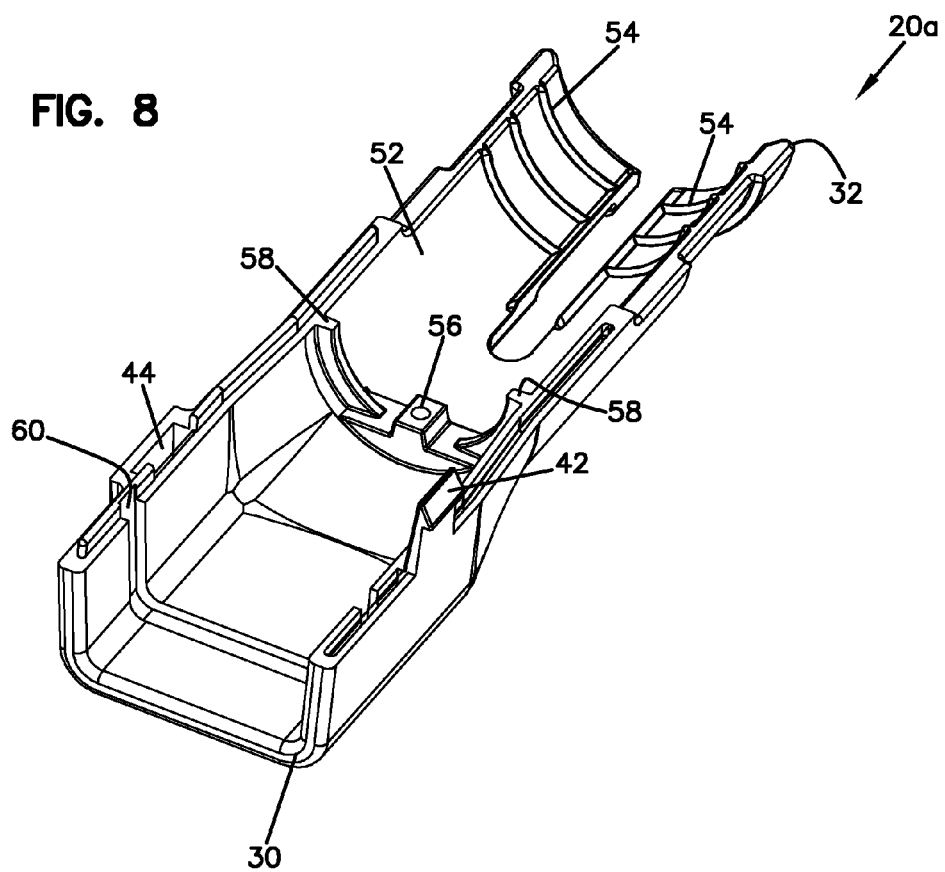
FIG. 8 is a perspective top view the housing portion.
Figure 9:
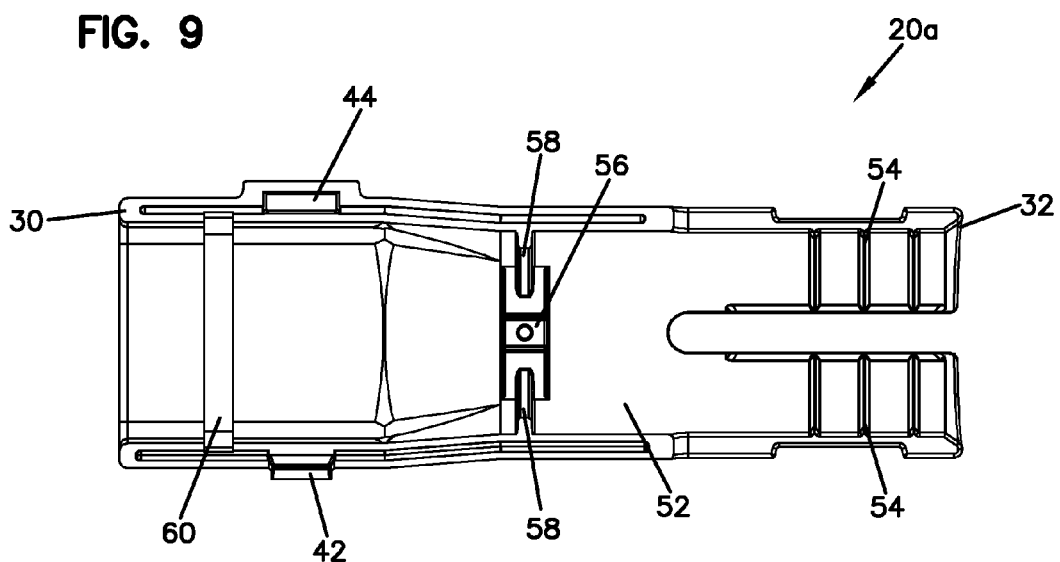
FIG. 9 is a top view of the housing portion.
Figure 10:
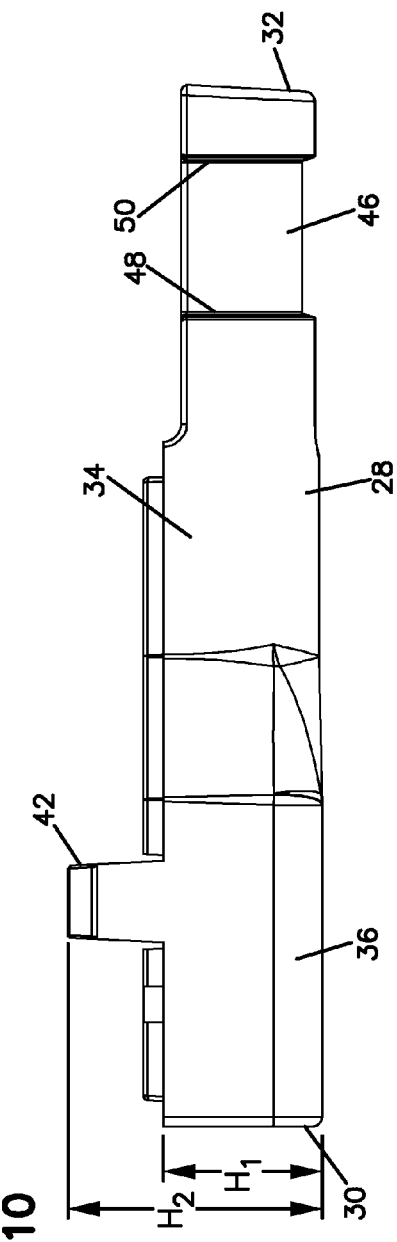
FIG. 10 is a side view of the housing portion.
Figure 11:
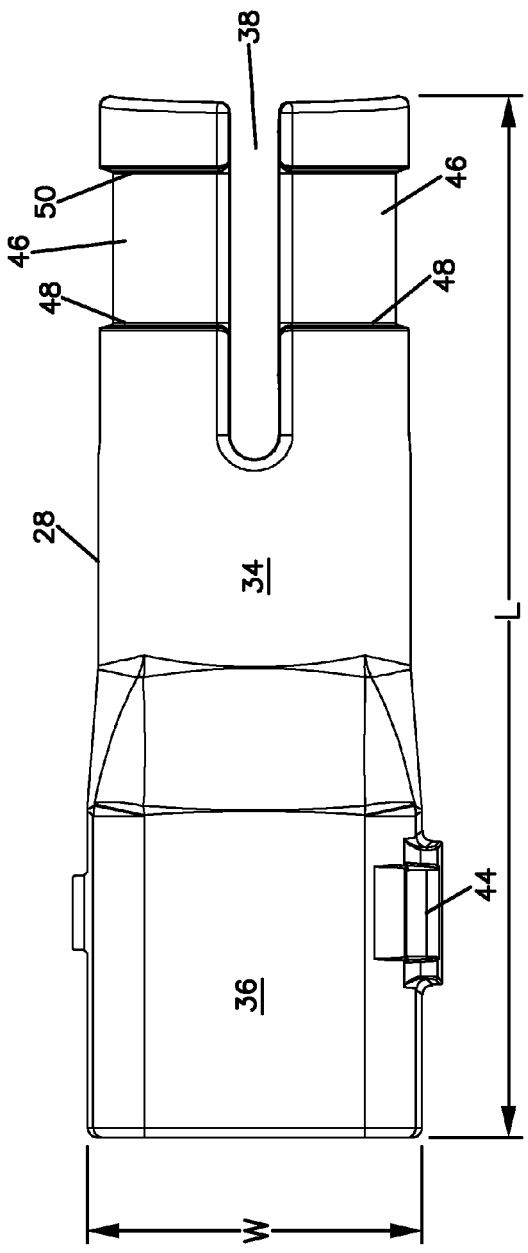
FIG. 11 is a bottom view of the housing portion.
Figure 13:
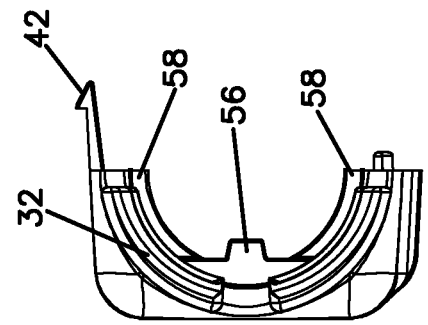
FIG. 13 is an opposite end view of the housing portion.
Figure 12:
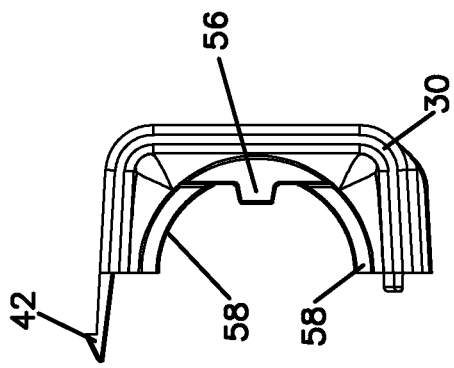
FIG. 12 is a first end view of the housing portion.
Figure 14:
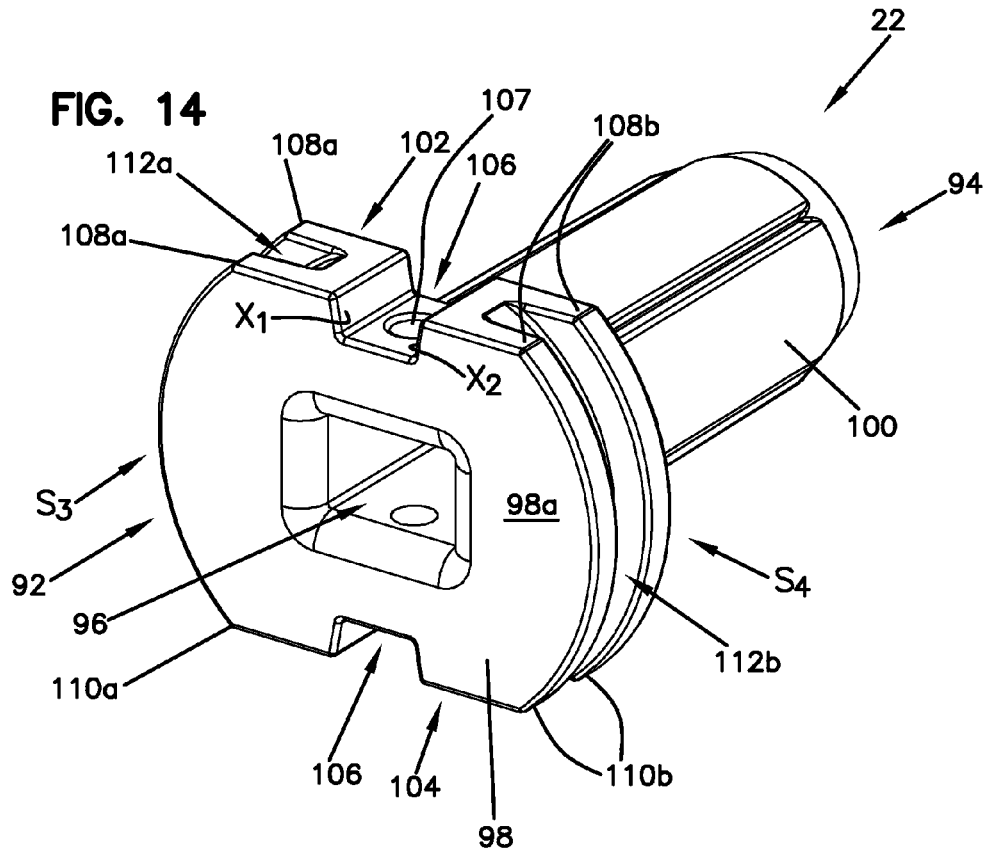
FIGS. 14 and 15 are perspective view of a fiber ribbon plug of the fiber cable fan-out assembly in accordance with the principles of the present disclosure.
Figure 15:
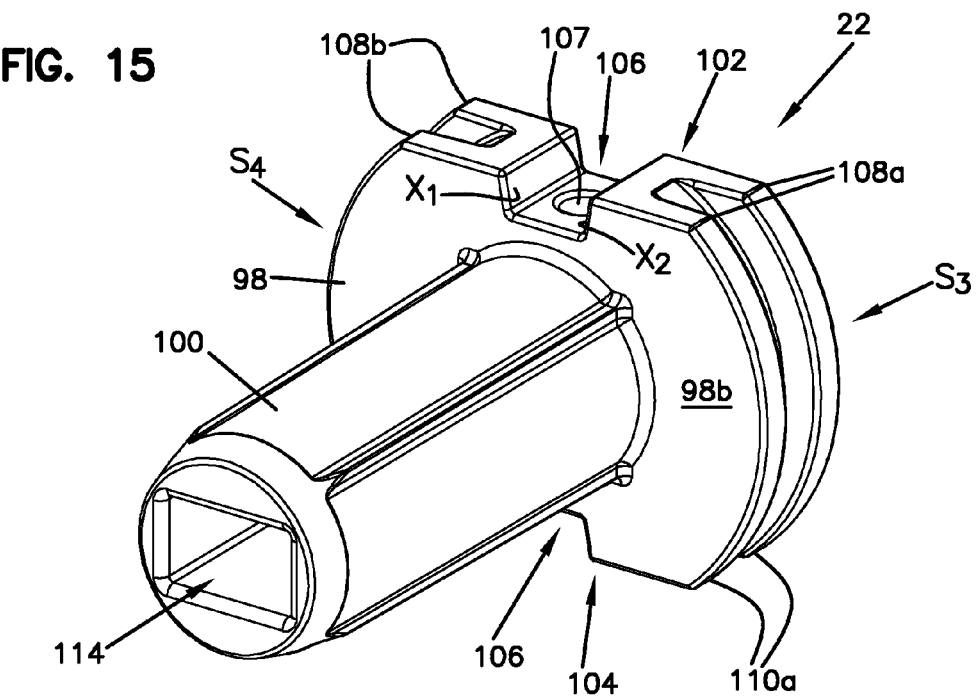

Turning to FIGS. 8 and 9, disposed on an interior surface 52 of the upper portion 20a are a plurality of ribs 54, a mounting block 56, retention shoulders 58, and an end slot 60. As shown at FIGS. 10 and 11, the upper portion 20a can have a first side $S_1$ and a second side $S_2$ that extends upwardly from the first exterior surface 34 and the second exterior surface 36. In one example, the height $H_1$ of the first and second sides $S_1$, $S_2$ from the exterior surfaces 34, 36 can be about 15.5 millimeters (mm). In other examples, a height $H_2$ of the upper portion 20a can extend to 24.763 mm when measured to the tip of the mating snap 42. In some examples, the upper portion 20a can include a length $L_1$. The length $L_1$ can be about 101.881 mm. In certain examples, the upper portion 20a can have a width $W_1$ measured from the tip of the mating snap 42 to the notch 44. The width $W_1$ can be about 36.016 mm. It will be appreciated heights $H_1$, $H_2$, width $W_1$, and length $L_1$ of the upper portion 20a can vary with other examples.

Turning again to FIG. 5, the upper and lower portions 20a, 20b of the housing 20 provide structure for mounting to the multi-fiber cable 12 and the furcation tubes 14. The multi-fiber cable 12 is provided as an input cable assembly 62, such as shown in FIG. 5. The input cable assembly 62 can include a fiber ribbon 64 and strength members 66 each including an epoxy rod reinforced with glass fiber rovings. In this example, there are 24 fiber ribbons. It will be appreciated that in other examples, the multi-fiber cable 12 can include a greater or lesser number of fiber ribbons (e.g., two, eight, twelve, twenty-four, thirty-two, etc.).

The strength members 66 can help provide both tensile and compressive reinforcement. The multi-fiber cable 12 can include a jacket 68 containing the fiber ribbon 64. In one example, multi-fiber cable 12 can include a core region surrounded by a cladding layer where one or more coating layers can surround the cladding layer. In one example, the coating layer or layers can be surrounded by a buffer layer 70. A heat recoverable sleeve 72 can be slid over the jacket 68 of the multi-fiber cable 12 such that an inner diameter of the heat recoverable sleeve 72 is larger than an outer diameter of the jacket 68. The heat recoverable sleeve 72 may be heat-shrunk to tightly cover the fiber ribbon 64 held within the fiber ribbon plug 22 to restrict bending and mechanical damage thereto. In certain examples, the plurality of ribs 54 of the upper portion 20a can engage the heat recoverable sleeve 72 in order to help grip the housing 20 onto the multi-fiber cable 12.

The furcation tubes 14 are provided in the form of output furcation cable assemblies 74 which provide an upjacket 76 for fibers 18 extending from the input cable assembly 62. Turning again to FIG. 5, a furcation tube assembly 75 is shown. In this example, the furcation tube assembly 75 includes the output of furcation cable assemblies 74 and the furcation tube organizer 24. Each output furcation cable assembly 74 includes an outer tube 78 and an inner tube 80. An intermediate strength member 82, such as aramid (Kevlar) yarn is provided. A furcation tube insert 84 mounts to proximal end 86 of the outer tube 78 and proximal end 88 of the intermediate strength member 82 with a crimp 90. The inner tube 80 can also be affixed to the furcation tube insert 84, such as with an adhesive, such as epoxy.

Referring to FIGS. 14-18, a perspective view of an example of the fiber ribbon plug 22 is depicted. The fiber ribbon plug 22 is adapted to be coupled to the input cable assembly 62. The fiber ribbon plug 22 can have a length $L_2$. In some examples, the length $L_2$ can be about 31 mm. The fiber ribbon plug 22 includes a proximal end 92 and a distal end 94. The fiber ribbon plug 22 defines a through-passage 96 that extends through the fiber ribbon plug 22 from the proximal end 92 to the distal end 94. In this way, the fiber ribbon plug 22 functions to capture and cover the fiber ribbon 64.

In one example, the fiber ribbon plug 22 can have a head plate 98 and a hollow cylindrical barrel 100. The head plate 98 has a first major surface 98a and a second major surface 98b.

The hollow cylindrical barrel 100 can extend from the second major surface 98b of the head plate 98. In some examples, the head plate 98 and the hollow cylindrical barrel 100 can be integrally formed or coupled together.

In one example, the head plate 98 of the fiber ribbon plug 22 can have a top surface 102 and a bottom surface 104 that can have a planar configuration. The top and bottom surfaces 102, 104 each define a notch seat 106 located in a center position above the through-passage 96. The notch seat 106 can extend between the first and second major surfaces 98a, 98b of the head plate 98. The head plate 98 can also include a left side $S_3$ and a right $S_4$. The left side $S_3$ curves outwardly between a left edge 108a of the top surface 102 and a left edge 110a of the bottom surface 104. The right side $S_4$ curves outwardly between a right edge 108b of the top surface 102 and a right edge 110b of the bottom surface 104. The left and right sides $S_3$, $S_4$ of the head plate 98 can each define a groove 112a, 112b between the first and second major surfaces 98a, 98b. In certain examples, the notch seat 106 can be centered between the left and right edges 108a, 108b of the top surface 102 and the left and right edges 110a, 110b of the bottom surface 104 respectively.

Figure 16:
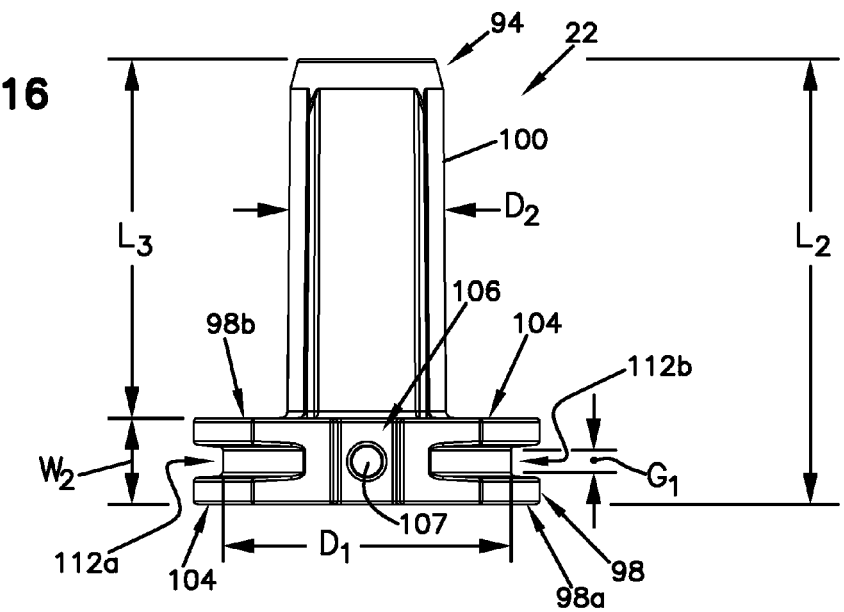
FIG. 16 is a top view of the fiber ribbon plug.
Figure 17:
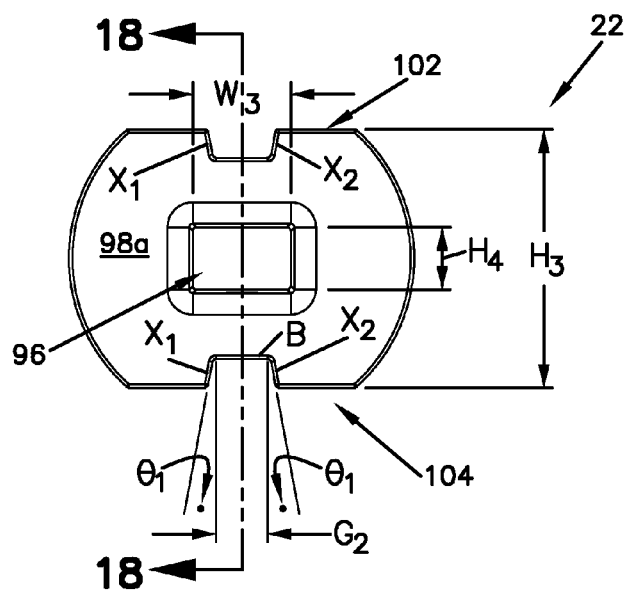
FIG. 17 is an end view of the fiber ribbon plug.
Figure 18:
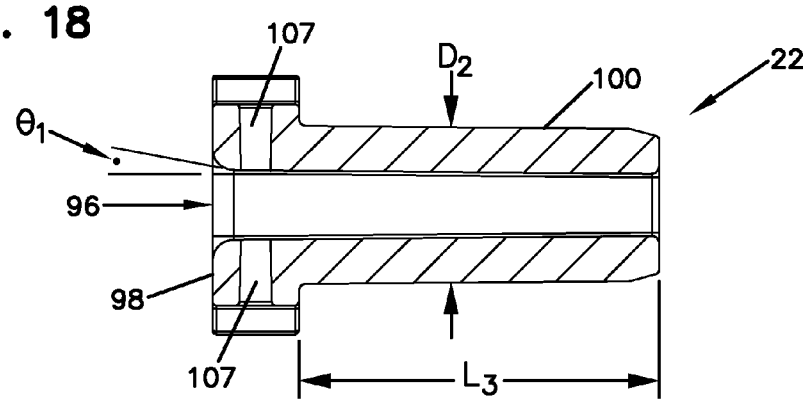
FIG. 18 is a side cross-sectional view of the fiber ribbon plug taken along lines 18-18 of FIG. 17.

As shown in FIGS. 16-18, the head plate 98 can have a diameter $D_1$. In one example, the diameter $D_1$ of the head plate 98 can be about 20 millimeters (mm) measured from the grooves 112a, 112b. In other examples, the diameter $D_1$ of the head plate 98 can be about 24 mm measured from the curved left and right sides $S_3$, $S_4$. The grooves 112a, 112b can define a gap $G_1$. In some examples, the gap $G_1$ can be about 2 mm. In other examples, the head plate 98 can include a width $W_2$ measured between the first and second major surfaces 98a, 98b. The width $W_2$ can be about 6 mm. In certain examples, the head plate 98 can have a height $H_3$ measured between the top and bottom surfaces 102, 104. The height $H_3$ can be about 18 mm. It will be appreciated height $H_3$, width $W_2$, and diameter $D_1$ of the head plate 98 can vary with other examples.

The through-passage 96 can generally have a rectangular shape. In certain examples, the through-passage 96 can have a height $H_4$. In one example, the height $H_4$ of the through-passage 96 can be about 4.32 mm. The through-passage 96 can have a width $W_3$. In one example, the width $W_3$ of the through-passage 96 can be about 6.8 mm. It will be appreciated heights $H_3$, $H_4$, width $W_2$, and length $L_2$ of the head plate 98 can vary with other examples. The rectangular shape of the through-passage 96 can match with the overall profile of the fiber ribbon 64. When the fiber ribbon 64 is inserted into the through-passage 96, the fiber ribbon 64 is securely held therein to help prevent the rotation of the fiber ribbon 64. This arrangement and configuration can help organize the fibers such that they are fanned out and aligned as desired into the furcation tubes 14.

In some examples, the notch seat 106 can define a gap $G_2$. In one example, the gap $G_2$ can be about 4 mm. The notch seat 106 can have a base B and two side walls $X_1$, $X_2$ extending from the base B. In certain examples, the base B can include a glue port 107. Epoxy can be added to the glue port 107 to help secure the fiber ribbon 64 within the through-passage 96 and to help prevent the rotation thereof. In one example, the two side walls $X_1$, $X_2$ can extend at an angle $\theta_1$ from the base B. In certain examples, the angle $\theta_1$ can be about 10 degrees. It will be appreciated that the gap $G_2$ and angle $\theta_1$ can vary to be less or greater with other embodiments.

In one example, the hollow cylindrical barrel 100 can define a cable aperture 114 at the distal end of the fiber ribbon plug 22. Similar to the through-passage 96, the cable aperture 114 can generally have a rectangular shape to match with the configuration of the fiber ribbon 64. The cable aperture 114 is adapted to receive the fiber ribbon 64 that can be secured within the through-passage 96 to help prevent the rotation thereof. The hollow cylindrical barrel 100 can have a length $L_3$ extending from the second major surface 98b to the distal end 94 of the fiber ribbon plug 22. In one example, the length $L_3$ can be about 25 mm. The hollow cylindrical barrel 100 can have a diameter $D_2$. In one example, the diameter $D_2$ of the hollow cylindrical barrel 100 can be about 11 mm. It will be appreciated that the length $L_3$ and diameter $D_2$ of the hollow cylindrical barrel 100 can vary with other embodiments.

The fiber ribbon plug 22 can be adapted to couple to the housing 20 of the fiber cable fan-out assembly 10. Upon attachment of the fiber ribbon plug 22 and the housing 20, each of the retention shoulders 58 of the upper housing portion 20a can be inserted into the grooves 112a, 112b of the head plate 98. Once the fiber ribbon plug 22 is inserted into the upper portion 20a by having each of the retention shoulders 58 slide into the grooves 112a, 112b of the head plate 98, the mounting block 56 of the upper portion 20a interfaces with the notch seat 106 of the head plate 98. The two side walls $X_1$, $X_2$ engage the mounting block 56 and hold the fiber ribbon plug 22 in position within the housing 20 as to help prevent rotation of the fiber ribbon plug 22 therein. This can also help to stabilize the fiber ribbon 64 within the through-passage 96 of the fiber ribbon plug 22 such that rotation of the fiber ribbon 64 is minimized. This configuration can help to keep the fiber ribbon 64 oriented and positioned as desired within the hollow cylindrical barrel 100 of the fiber ribbon plug 22 and into the furcation tube organizer 24. Once secured, epoxy or other material can be poured into the glue port 107 to surround the fiber ribbon 64. Following curing of the epoxy, the lower portion 20b can be mounted to the upper portion 20a to form the housing 20.

Figure 19:
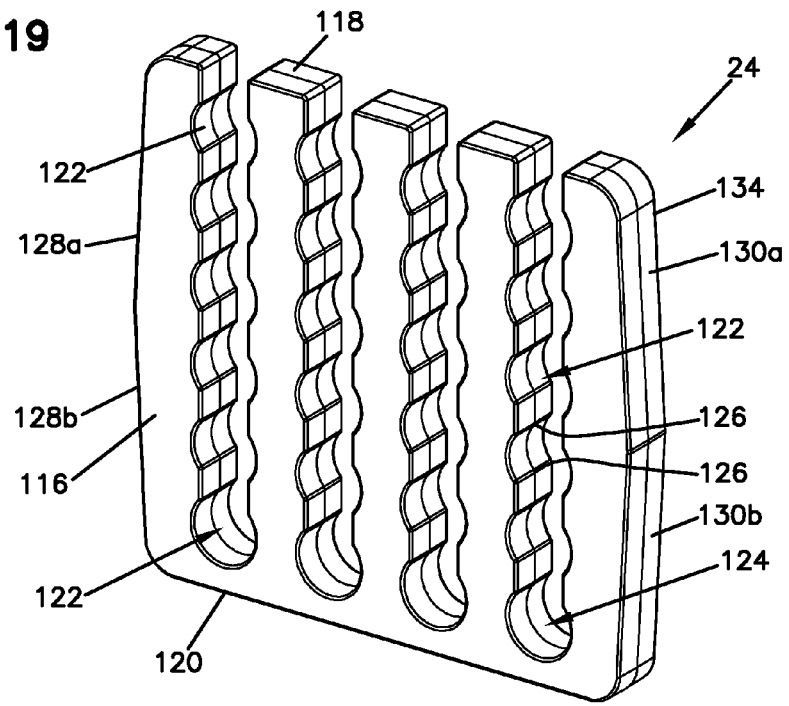
FIG. 19 is a perspective view of a furcation tube organizer of the fiber cable fan-out assembly in accordance with the principles of the present disclosure.
Figure 20:
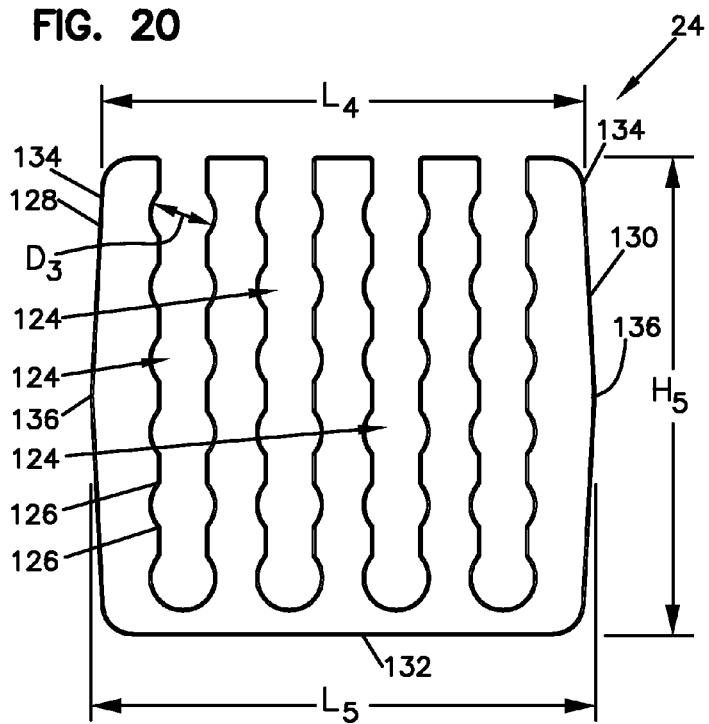
FIG. 20 is a top view of the furcation tube organizer.
Figure 21:
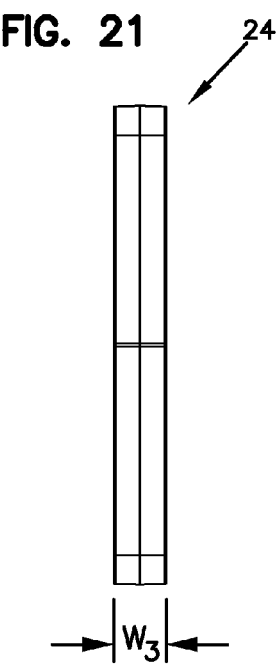
FIG. 21 is a side view of the furcation tube organizer.

Referring to FIGS. 19-21, the furcation tube organizer 24 is depicted. The furcation tube organizer 24 includes a body 116 having a first end 118 and an opposite end 120. Cavities 122 are defined in the body 116 of the furcation tube organizer 24 extending in a longitudinal direction between the first and second ends 118, 120. In one example, the furcation tube organizer 24 includes four cavities. It will be appreciated that the number of cavities 122 may vary with other embodiments. The cavities 122 include cylindrically shaped openings 124 spaced equally along the cavities 122. In one example, the cavities 122 can include a total of twenty four cylindrically shaped openings 124, six cylindrically shaped openings 124 in each cavity 122. It will be appreciated that the number of cylindrically shaped openings 124 can vary with other embodiments. In some examples, the cylindrically shaped openings 124 can have a diameter $D_3$ and define catches 126 for holding the furcation tubes 14 therein. In one example, the diameter $D_3$ can be about 3.5 mm. It will be appreciated that the diameter $D_3$ of the cylindrical openings 124 can vary with other embodiments.

The furcation tube organizer 24 can include a left side 128 and a right side 130 that extend from a bottom 132. The left side 128 can include a top angled portion 128a and a bottom angled portion 128b. The right side 130 can include a top angled portion 130a and a bottom angled portion 130b. The top and bottom angled portions 128a, 128b of the left side 128 of the furcation tube organizer 24 and the and bottom angled portions 130a, 130b of the right side 130 of the furcation tube organizer 24 can define a length $L_4$ and $L_5$. In some examples, the length $L_4$ can be measured from an edge 134 of the left and right sides 128, 130 of the furcation tube organizer 24. In one example, the length $L_4$ can be about 27 mm. In other examples, the length $L_5$ can be measured from a center point 136 in the left and right sides 128, 130 of the furcation tube organizer 24. The center point 136 can be where a segment of the top and bottom angled portions 128a, 128b, 130a, 130b of the left and right sides 128, 130 respectively meet. The furcation tube organizer 24 can have a height $H_5$ between the first end 118 and opposite end 120. In one example, the height $H_5$ can be about 27 mm. The furcation tube organizer 24 can have a width $W_3$. In one example, the width $W_3$ can be about 3 mm. It will be appreciated that the length $L_4$, $L_5$, height $H_5$, and width $W_3$ of the furcation tube organizer 24 can vary with other embodiments.

The furcation tube organizer 24 can be mounted to the housing 20 by inserting the furcation tube organizer 24 within the end slot 60 of the upper portion 20a and likewise the lower portion 20b. The furcation tubes 14 can be inserted into the cylindrically shaped openings 124.

Figure 22:
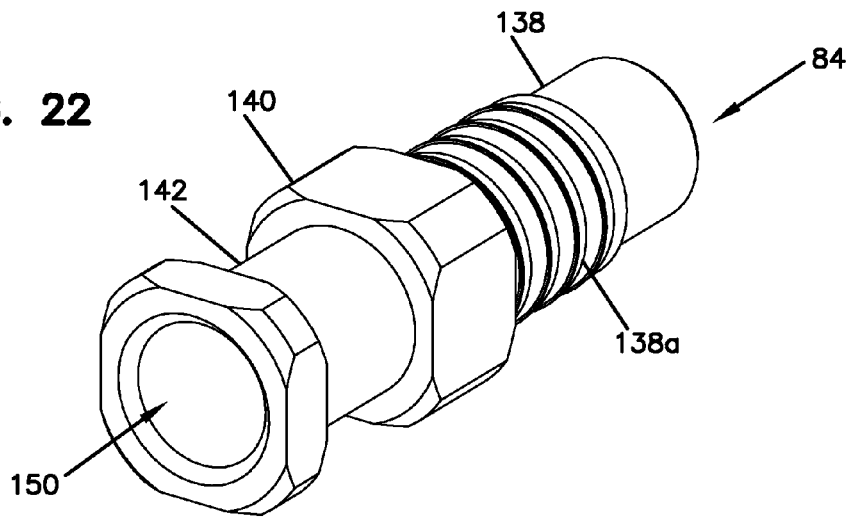
FIG. 22 is a perspective view of a furcation tube insert of the fiber cable fan-out assembly in accordance with the principles of the present disclosure.
Figure 23:
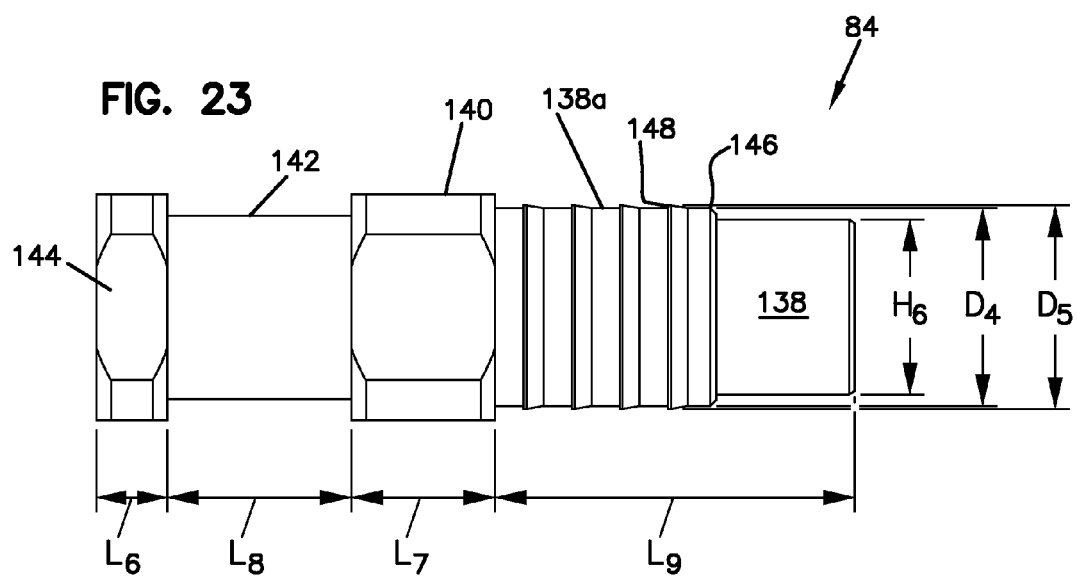
FIG. 23 is a top view of the furcation tube insert.
Figure 24:
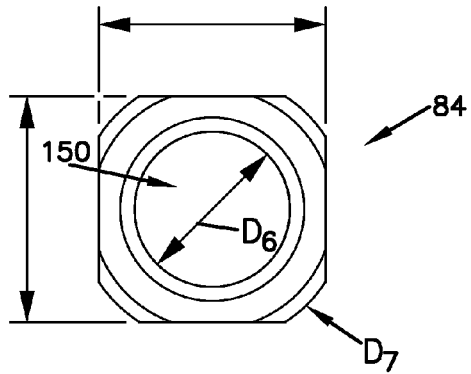
FIG. 24 is an end view of the furcation tube insert.

Referring to FIGS. 22-24, a perspective view of the furcation tube insert 84 is shown. The furcation tube insert 84 includes a shaft 138, a nut 140, and a notch 142. The shaft 138 of the furcation tube insert 84 can have a height $H_6$. In one example, the height $H_6$ can be about 3.1 mm. It will be appreciated that the height $H_6$ can vary with other embodiments. The shaft 138 can include a ridged portion 138a that extends outwardly from the shaft 138. The diameter of the ridged portion 138a can be defined by a first raised portion 146 and a second raised portion 148. The first raised portion 146 can have a diameter $D_4$. In one example, the diameter $D_4$ of the ridged portion 138a of the shaft 138 can be about 3.5 mm. The second raised portion 148 can have a diameter $D_5$. In one example, the diameter $D_5$ of the ridged portion 138a of the shaft 138 can be about 3.6 mm. It will be appreciated that the diameters $D_{4-5}$ can vary with other embodiments.

The notch 142 of the furcation tube insert 84 can engage the cylindrically shaped openings 124 of the furcation tube organizer 24 and can be held therein by the catches 126. The nut 140 and a head 144 of the furcation tube insert 84 can act as stops in the cylindrically shaped openings 124 to prevent each of the output furcation cable assembly 74 from being removed from housing 20. Once each of the output furcation cable assembly 74 is in place, each input cable assembly 62 is mated by inserting protruding fibers 18 through the furcation tubes 14, twelve fibers 18 per furcation tube 14. It will be appreciated that the number of protruding fibers 18 can vary per furcation tube 14. Selected fibers 18 can be placed in furcation tubes 14 as desired.

In certain examples, the head 144 of the furcation tube insert 84 can have a length $L_6$. In one example, the length $L_6$ of the head 144 can be 1.25 mm. The nut 140 of the furcation tube insert 84 can have a length $L_7$. In one example, the length $L_7$ of the nut 140 can be 2.54 mm. The head 144 and the nut 140 can define the length $L_8$ of the notch 142. The length $L_8$ of the notch 142 extends between the head 144 and the nut 140. In one example, the length $L_8$ of the notch 142 can be about 3.25 mm. The shaft 138 of the furcation tube insert 84 can have a length $L_9$. In one example, the length $L_9$ of the shaft 138 can be 6.35 mm. It will be appreciated that the lengths $L_{6-9}$ can vary with other embodiments.

The furcation tube insert 84 can define a void 150 through the head 144. The void 150 can have an inner diameter $D_6$ and an outer diameter $D_7$. In some examples, the inner diameter $D_6$ can be about 2.75 mm and the outer diameter $D_7$ can be 4.763 mm. It will be appreciated that the diameters $D_{6-7}$ can vary with other embodiments.

Figure 25:
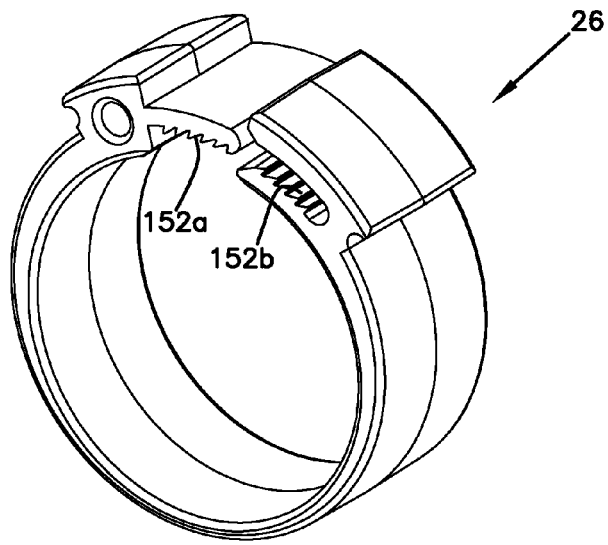
FIG. 25 is a perspective view of a cable clamp in accordance with the principles of the present disclosure.
Figure 26:
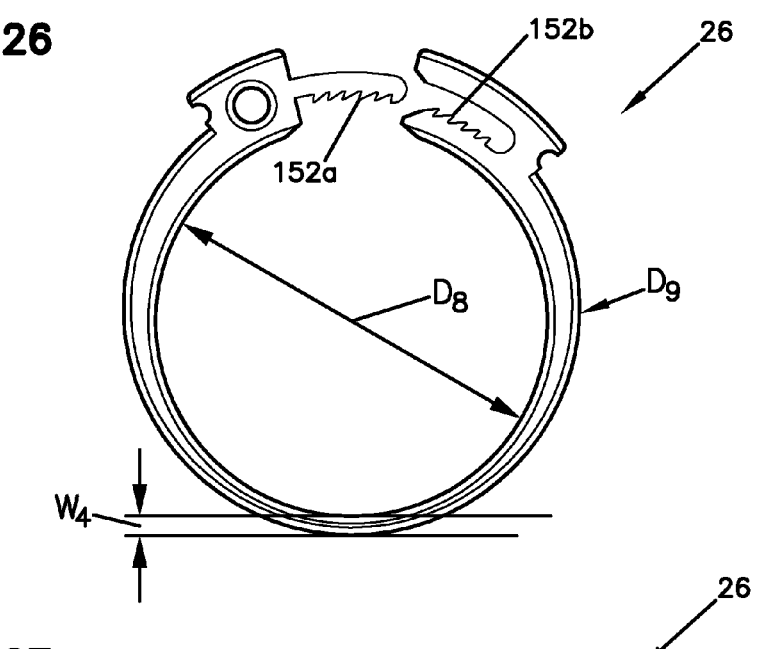
FIG. 26 is a side view of the cable clamp.
Figure 27:
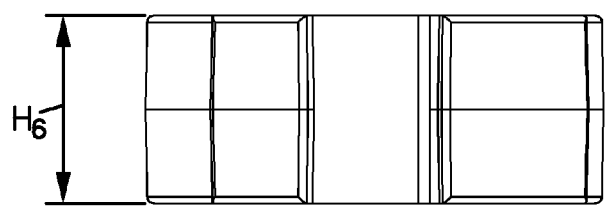
FIG. 27 is a top view of the cable clamp.

Referring to FIGS. 25-27, a perspective view of the cable clamp 26 is shown. The cable clamp 26 (e.g., cable tie) can have a low profile design. In one example, the cable claim 26 can define a width $W_4$. In certain examples, the width $W_4$ can be about 1.5 mm. In other examples, the cable claim 26 can define a height $H_6$. In certain examples, the height $H_6$ can be about 14 mm. The cable clamp 26 can further define an inner diameter $D_8$ and an outer diameter $D_9$. In one example, the inner diameter $D_8$ can be about 29 mm and the outer diameter $D_9$ can be about 34 mm. It will be appreciated that the height $H_6$, width $W_4$, inner diameter $D_8$, and outer diameter $D_9$ may vary with other embodiments.

The cable clamp 26 can include teeth 152a configured in a first direction and opposing teeth 152b positioned in a second direction opposite the first direction. In some examples, pliers can be used to crank the teeth 152a, 152b together such that the teeth 152a, 152b engage each other and are prevented from coming apart. The cable clamp 26 can be tightened around the housing 20 within the recess 46. As the cable clamp 26 is tightened, the plurality of ribs 54 of the upper and lower portions 20a, 20b of the housing 20 can sink into the heat recoverable sleeve 72 to help hold the fiber ribbons 64 in place and to prevent twisting and/or rotation of the fiber ribbons 64.

Figure 28:
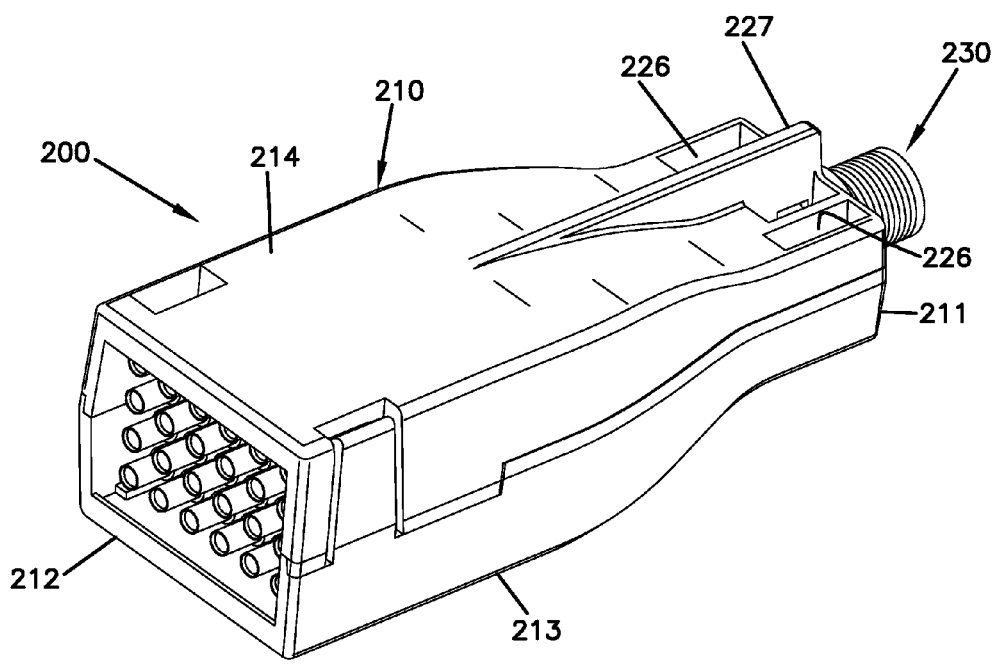
FIGS. 28 and 29 illustrate another example fan-out assembly in accordance with the principles of the present disclosure.
Figure 29:
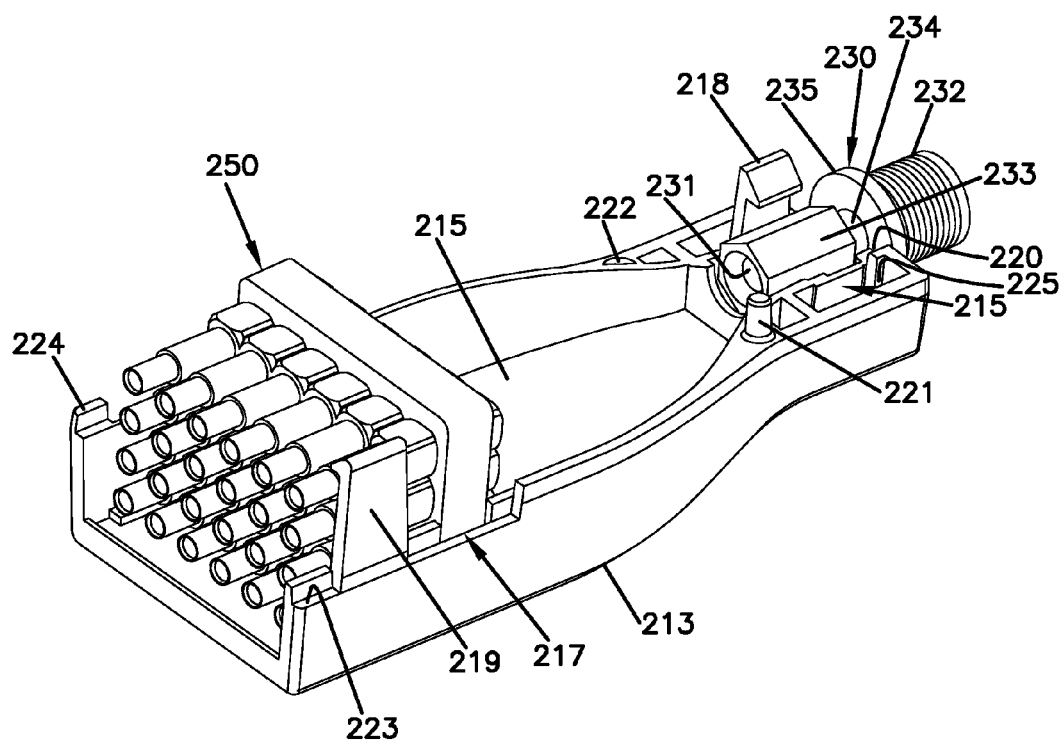

FIGS. 28 and 29 illustrate another example fanout assembly 200 extending between a first end 211 and a second end 212. The fanout assembly 200 includes a cable anchor 230 at the first end 211. The fanout assembly 200 also includes a furcation tube assembly 250 disposed towards the second end 212. The fanout assembly 200 also includes an outer shell 210 that surrounds the furcation tube assembly 250. In some implementations, the cable anchor 230 is a separate part that is coupled to the outer shell 210. In other implementations, the cable anchor 230 is integrally formed with the outer shell 210.

The outer shell 210 includes a first part 213 and a second part 214 that cooperate to define an interior 215. In some implementations, the first and second parts 213, 214 cooperate to define a first interior mounting location 216 at which the cable anchor member 230 is rotationally and axially fixed relative to the outer shell 210. In certain implementations, the first interior mounting location 216 defines a channel extending to the first end 211 for receiving the cable anchor 230. In other implementations, each of the first and second parts 213, 214 include a crimp support flange. The crimp support flanges cooperate to form the cable anchor.

The cable anchor 230 defines a through-passage 231 sized to enable optical fiber to extend therethrough. In certain examples, the through-passage 231 is sized to receive up to about twenty-four optical fibers. In certain examples, the through-passage 231 is sized to receive up to about forty-eight optical fibers. In certain examples, the through-passage 231 is sized to receive up to about twelve optical fibers. In certain examples, the through-passage 231 is sized to receive up to about 144 optical fibers. In certain examples, the through-passage 231 is sized to receive up to about seventy-four optical fibers.

The cable anchor 230 includes a crimp support section 232 that extends outwardly from the outer shell 210 when the cable anchor 230 is disposed at the first mounting location 216. A cable jacket can be crimped to the crimp support section 232 while the optical fibers extend through the through-passage 231. Optionally, a strength layer and/or a buffer tube can be crimped to the crimp support section 232.

The cable anchor 230 is configured to be rotationally fixed to the outer shell 210. In certain implementations, the cable anchor 230 can include a keying section 233 that fits in the channel at the first interior mounting location 216. In examples, the keying section 233 defines flat exterior surfaces that can abut one or more flat interior surfaces of the channel.

The cable anchor 230 is configured to be axially fixed to the outer shell 210. In certain implementations, the cable anchor 230 includes an outwardly extending flange 235 that is larger than an opening defined at the first end 211 of the outer shell 210. The flange 235 inhibits movement of the cable anchor 230 towards the second end of the outer shell 210. In certain implementations, the cable anchor 230 defines a circumferential recess 234 disposed between the flange 235 and the keying section 233. Structure at the first end of the outer shell 210 extends into the recess 234 to inhibit movement of the cable anchor 230 out of the outer shell 210 at the first end 211.

The first and second parts 213, 214 also cooperate to define a second interior mounting location 217 at which the furcation tube assembly 250 is axially and rotationally fixed to the outer shell 210. For example, the outer shell 210 may define a circumferential channel for receiving the furcation tube assembly 250. In certain implementations, the furcation tube assembly 250 is substantially the same as the furcation tube assembly 75 of FIG. 5. The organizer seats in the circumferential channel. The second interior mounting location 217 is spaced from the first interior mounting location 216 sufficient to enable optical fibers of a ribbon to transition to separate furcation tube arrangements 255. The outer shell 210 is open at the second end 212 of the fanout assembly 200 to enable optical fibers of a cable to extend out of the fanout assembly 200.

The first and second parts 213, 214 of the outer shell 210 are configured to secure together. In certain implementations, the first and second parts 213, 214 are configured to latch together. In the example shown, each part 213, 214 includes a latch arm 218 at the first end 211 and a second latch arm 219 at the second end 212. Each part 213, 214 also defines a first recessed catch 220 at the first end 211 in lateral alignment with the first latch arm 218 and a second recessed catch at the second end 212 in lateral alignment with the second latch arm. In an example, the latch arms 218, 219 are disposed at opposite sides of the parts 213, 214. In another example, the latch arms 218, 219 are disposed on a common side of the parts 213, 214.

In some implementations, the first and second parts 213, 214 include an alignment arrangement. In certain implementations, the alignment arrangement includes a pin 221 laterally aligned with a hole 222 sized to receive the pin 221. When the first and second parts 213, 214 are latched together, the pin 221 of the first part 213 aligns with the hole 222 of the second part 214 and vice versa. In certain implementations, the alignment arrangement includes a recess 223 defined in an exterior surface of one side of each part 213, 214 and a tab 224 disposed at an opposite side of each part 213, 214. The tab 224 is sized to fit in the recess 223.

Each part 213, 214 of the outer shell 210 defines slots 225 on opposite sides of the cable anchor 230. The slots 225 are laterally aligned. When the parts 213, 214 are latched together, the slots 225 define two through-openings 226 extending transverse to the through-passage 231 of the cable anchor 230. A fin 227 extends outwardly from the outer shell 210 between the two through-openings 226. When the fanout assembly 200 is assembled, a cable tie can be disposed at the through-openings 226. The fin 227 inhibits kinking/buckling at the first end 211 that may otherwise have been caused by tightening the cable tie.

From the forgoing detailed description, it will be evident that modifications and variations can be made without departing from the spirit and scope of the disclosure.

We claim:

1. A multi-fiber cable assembly comprising:
   a multi-fiber cable including:
      a block of optical fiber ribbons, the block having an external profile;
      a strength is surrounding the optical fiber ribbons;
      a jacket surrounding the strength layer; and
   a fanout arrangement disposed at a first end of the multi-fiber cable, the fanout arrangement including:
      an outer shell extending from a first end to a second end, the outer shell including a first interior mounting location spaced axially from a second interior mounting location;
      an orientation plug defining a longitudinal through-passage through which the block of optical fiber ribbons extends, the through-passage having an internal profile that inhibits rotation of the block of optical fiber ribbons, the orientation plug including a keying arrangement that axially and rotationally fixes the orientation plug to the outer shell at the first interior mounting location;
      a furcation tube assembly axially and rotationally fixed to the outer shell at the second interior mounting location, the furcation tube assembly including a plurality of furcation tube arrangements mounted to an organizer.

2. The multi-fiber cable assembly of claim 1, wherein the organizer includes a plate defining a plurality of slots, each slot having an open end, each furcation tube arrangement being configured to slide into one of the slots through the open end to axially fix the furcation tube arrangement at the plate.

3. The multi-fiber cable assembly of claim 2, wherein each of the furcation tube arrangements includes a furcation tube mounted to a first end of an insert using a crimp sleeve, and wherein a second end of the insert defines an annular recess into which edges of the respective slot extends to axially fix the furcation tube arrangement to the plate.

4. The multi-fiber cable assembly of claim 2, wherein each of the slots defined by the plate has a plurality of notched locations at which the furcation tube arrangements are indexed.

5. The multi-fiber cable assembly of claim 1, wherein the first end of the outer shell has a rounded profile and the second end of the outer shell has a rectangular profile.

6. The multi-fiber cable assembly of claim 1, further comprising a clamp disposed at an annular recess defined in the first end of the outer shell, the clamp applying a radially compressive force on the first end of the outer shell.

7. The multi-fiber cable assembly of claim 6, wherein the clamp is spaced along the outer shell from the orientation plug.

8. The multi-fiber cable assembly of claim 6, wherein the first end of the outer shell defines axial slots that separate the first end into axially extending flange members to facilitate compression of the first end of the outer shell by the clamp.

9. The multi-fiber cable assembly of claim 1, further comprising a heat recoverable sleeve disposed around the jacket.

10. The multi-fiber cable assembly of claim 9, wherein an interior surface of the outer shell at the first end of the outer shell defines raised circumferentially-extending ribs that dig into the heat recoverable sleeve.

11. The multi-fiber cable assembly of claim 1, wherein a mounting section of the orientation plug defines an outwardly facing channel; and wherein the first interior mounting location of the outer shell includes an inwardly extending rail that fits in the outwardly facing channel to axially fix the orientation plug at the first interior mounting location.

12. The multi-fiber cable assembly of claim 11, wherein the mounting section defines a notch; and wherein the first interior mounting location includes a protrusion that fits in the notch to rotationally fix the orientation plug at the first interior mounting location.

13. The multi-fiber cable assembly of claim 1, wherein the second interior mounting location of the outer shell defines a channel sized to receive an exterior edge of the plate of the furcation tube assembly to axially and rotationally fix the furcation tube assembly to the second interior mounting location.

14. The multi-fiber cable assembly of claim 1, wherein the outer shell includes a first part and a second part that latch together.

15. A fanout arrangement comprising:
   an outer shell extending from a first end to a second end, the outer shell including a first part that cooperates with a second part to define a through-passage between the first and second ends, the outer shell including an interior mounting location disposed within the through-passage;
   a cable anchor arrangement disposed at the first end of the outer shell; and
   a furcation tube assembly disposed and axially fixed at the interior mounting location, the furcation tube assembly including a plurality of furcation tube arrangements mounted to an organizer, the organizer defining a plurality of slots having open ends, each slot defining a plurality of indexed positions, each furcation tube arrangement including a furcation tube, an insert, and a crimp sleeve, the furcation tube mounting to a first end of the insert using the crimp sleeve, wherein a second end of each of the inserts is disposed within one of the slots of the organizer at one of the indexed positions, the furcation tube arrangements extending from the organizer in a series of rows.

16. The fanout arrangement of claim 15, wherein the outer shell defines another interior mounting location at which an orientation plug is axially and rotationally fixed to the outer shell.

17. The fanout arrangement of claim 15, further comprising a support structure disposed at the first end of the outer shell, the support structure having a first end configured to key to the outer shell and a second end extending outwardly from the outer shell, and the support structure defining a through-passage.

18. The fanout arrangement of claim 17, further comprising a cable crimped to the second end of the support structure, wherein fibers of the cable extend through the through-passage of the support structure and into the through-passage of the outer shell.

19. The fanout arrangement of claim 15, wherein the first and second parts are identical.

20. The fanout arrangement of claim 15, wherein each of the first and second parts includes a latch arm on a first side and a recess sized to receive the latch arm on an opposite second side.

21. The fanout arrangement of claim 15, wherein each of the first and second parts includes an axially-extending ridge on a first side and an axially-extending channel sized to receive the ridge on an opposite second side.

22. The fanout arrangement of claim 15, wherein a first end of each of the first and second parts defines an axial slot that separates the first ends of the first and second parts into axially extending flange members.

23. The multi-fiber cable assembly of claim 1, wherein the furcation tube assembly includes twenty-four furcation tubes.

24. A method of fanning out an optical fiber ribbon of a cable, the optical fiber ribbon including a plurality of optical fibers, the method comprising:
   threading furcation tube arrangements over the optical fibers of the optical fiber ribbon, each of the furcation tube arrangements being threaded over at least one of the optical fibers;
   sliding each of the furcation tube arrangements through an open end of one of a plurality of slots defined in an organizer;
   positioning each of the furcation tube arrangements at an indexed position along the slot;
   positioning the organizer within an outer shell so that the organizer is rotationally and axially fixed within the outer shell; and
   attaching the cable to the outer shell.

25. The method of claim 24, wherein attaching the cable to the outer shell comprises crimping the cable to the outer shell.

26. The method of claim 24, wherein attaching the cable to the outer shell comprises clamping the cable to the outer shell.

* * * * *